US010131321B1

(12) United States Patent
Ahsan et al.

(10) Patent No.: US 10,131,321 B1
(45) Date of Patent: Nov. 20, 2018

(54) SYSTEM FOR KEYLESS VALET PARKING

(71) Applicant: Ford Global Technologies, LLC, Dearborn, MI (US)

(72) Inventors: Salman Ahsan, Livonia, MI (US); Vivekanandh Elangovan, Canton, MI (US); Kevin Thomas Hille, Plymouth, MI (US); Gregory William Farrey, Ypsilanti, MI (US); Thomas Kasper, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/653,168

(22) Filed: Jul. 18, 2017

(51) Int. Cl.

| | |
|---|---|
| ***B60R 25/24*** | (2013.01) |
| ***G07B 15/02*** | (2011.01) |
| *G07C 9/00* | (2006.01) |

(52) U.S. Cl.
CPC .............. *B60R 25/24* (2013.01); *G07B 15/02* (2013.01); *B60R 2325/101* (2013.01); *G07C 2009/00753* (2013.01); *G07C 2009/00769* (2013.01); *G07C 2009/00825* (2013.01)

(58) Field of Classification Search
CPC ...... G07C 9/00309; G07C 2009/00769; G07C 9/00111; G07C 9/00007; G07C 9/00571; G07C 2009/00793; G07C 2209/63
USPC ........................................................ 340/5.61
See application file for complete search history.

(56) References Cited

U.S. PATENT DOCUMENTS

| | | | | |
|---|---|---|---|---|
| 5,677,664 | A | 10/1997 | Sawinski | |
| 5,959,540 | A | 9/1999 | Walter | |
| 7,075,409 | B2 | 7/2006 | Guba | |
| 9,283,931 | B2 | 3/2016 | Skelton | |
| 9,902,368 | B2 * | 2/2018 | Maiwand | B60R 25/24 |
| 2004/0135669 | A1 | 7/2004 | Muench-Casanova | |
| 2008/0117079 | A1 * | 5/2008 | Hassan | B60R 25/045 340/901 |
| 2014/0104771 | A1 * | 4/2014 | Colan | G08C 17/02 361/679.4 |
| 2015/0203125 | A1 | 7/2015 | Penilla et al. | |

FOREIGN PATENT DOCUMENTS

WO WO 20001025572 A1 4/2001

* cited by examiner

*Primary Examiner* — Mark Blouin
(74) *Attorney, Agent, or Firm* — James P. Muraff; Neal, Gerber & Eisenberg LLP

(57) ABSTRACT

Method and apparatus are disclosed for a system for keyless entry. An example vehicle includes a valet dongle, a dock configured to connect to the valet dongle; and a valet manager. The valet manager enables the valet dongle to authorize keyless entry and keyless ignition when (a) the valet dongle is removed from the dock while an ignition of the vehicle is on and (b) an authorized passcode is provided via an infotainment head unit.

15 Claims, 6 Drawing Sheets

SYSTEM FOR KEYLESS VALET PARKING

TECHNICAL FIELD

The present disclosure generally relates to keyless entry for vehicles and, more specifically, a system for keyless entry.

BACKGROUND

Increasingly, vehicle are being manufactured with keyless entry systems that facilitate a driver unlocking and starting the vehicle without a key. Passive-entry-passive-start (PEPS) systems use a fob. In such a system, when the fob is close to the vehicle, the vehicle primes the doors to unlock when a door handle is touched. Additionally, when the fob is inside the vehicle, the vehicle enables push-button ignition. Phone-as-a-key (PaaK) systems are similar, except instead of a dedicated fob, the system uses the driver's phone coupled with an application executing on the phone to determine when to unlock the doors and enable the ignition.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a system for keyless entry. An example vehicle includes a valet dongle, a dock configured to connect to the valet dongle; and a valet manager. The valet manager enables the valet dongle to authorize keyless entry and keyless ignition when (a) the valet dongle is removed from the dock while an ignition of the vehicle is on and (b) an authorized passcode is provided via an infotainment head unit.

An example method includes enabling a valet dongle associated with a vehicle to operate a keyless entry and keyless ignition system when (a) the valet dongle is removed from a dock while an ignition of the vehicle is on, and (b) an authorized passcode is provided via an infotainment head unit. Additionally, the example method includes, after enabling the valet dongle, disabling the valet dongle when (a) the valet dongle is docked in the dock, (b) an input to end a valet mode is received via an infotainment head unit, and (c) an authorized mobile device is present.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
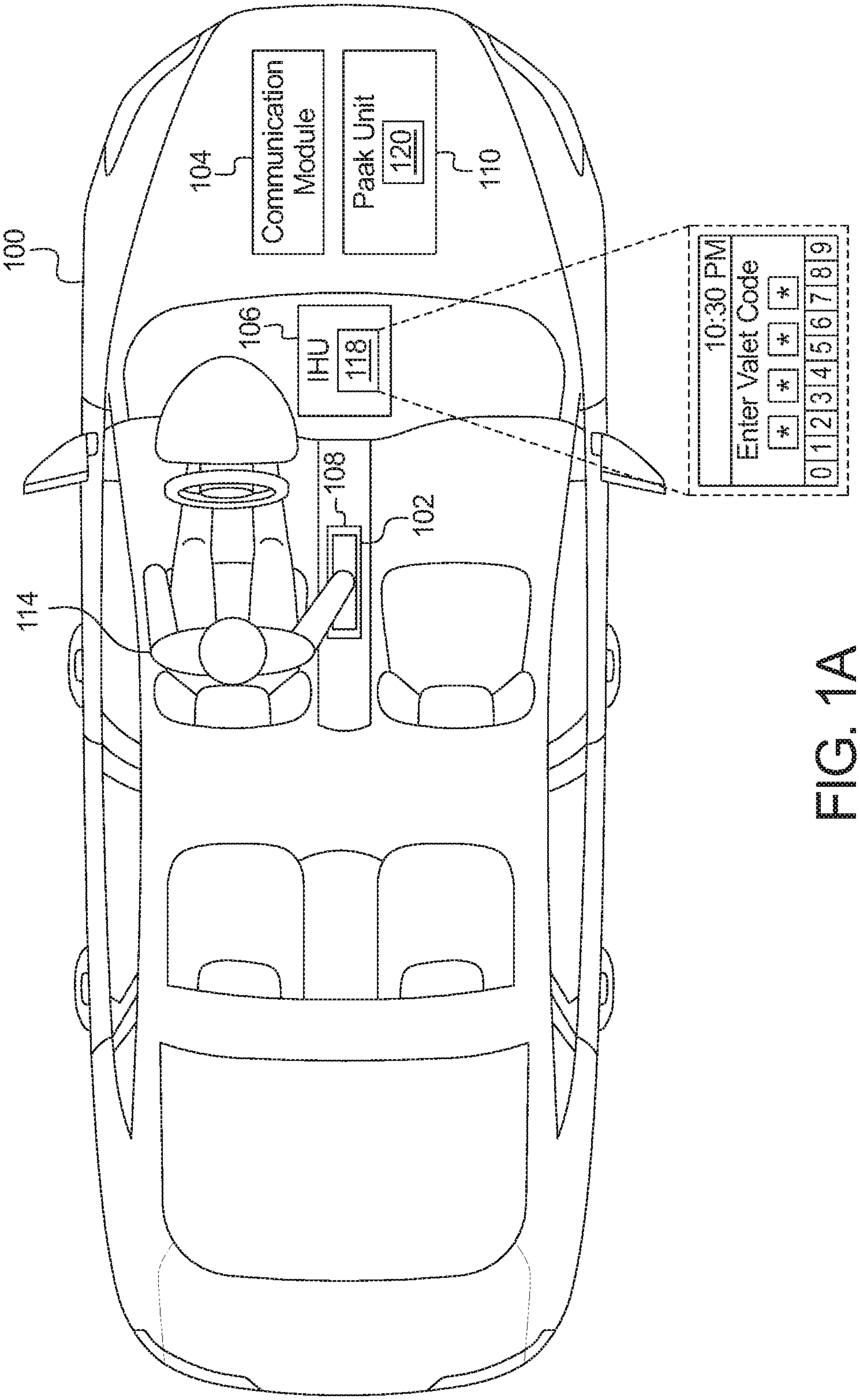
FIGS. 1A, 1B, and 1C illustrate a vehicle with a valet dongle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

People use valet parking for a variety of reasons. For example, in highly congested areas or at specialty parking garages, valet parking allows cars to be parked in a secure area where space can be used more efficiently when compared to self parking. Additionally, valet parking can help control traffic flow. Traditionally, a driver hands his/her keys to a valet, who then parks the car. However, as phone-as-a-key (Paak) keyless entries systems become more common, drivers will not relinquish control of their phone.

As describe below, a valet dongle is connected to a vehicle and, when removed, provides temporary keyless entry and keyless ignition without the driver relinquishes control of their phone. The valet dongle provides limited access to the vehicle to a temporary driver such as a valet. Additionally, when the dongle is used to start the ignition of the vehicle, the vehicle may place restrictions on the control of the vehicle (e.g., speed limits, distance limits, infotainment system limits, etc.). The valet dongle is a device that connects to a port (e.g., a universal serial bus port, etc.) in the vehicle. In some examples, the dongle is recessed into a panel of the vehicle, such as the center console of the vehicle. In some such examples, the panel may have compartment with the a door to conceal the valet dongle when not in use. The dongle includes a personal area wireless communication module (e.g., a Bluetooth® Low Energy (BLE), etc.) to communicate with the vehicle. In some examples, the dongle also includes a button that, when pressed, causes the dongle to send a message to the vehicle for the vehicle to provide an alert (e.g., flashing lights, a horn honk, etc.) to inform the valet dongle holder of the location of the vehicle.

When the valet dongle is disconnected when the ignition of the vehicle is off, the infotainment system prompts the driver to enter a passcode (e.g., a numeric or alphanumeric string of characters, etc.) to authenticate that the driver has authorization to enable the valet dongle. If the passcode is correct, the vehicle enables the valet dongle. In some examples, the vehicle provides a temporary authentication code to the valet dongle to authorize the valet dongle to activate the keyless entry and keyless start features for a limited number of uses. For example, the authentication code may only be valid until the valet dongle is disabled, at which point the authentication code cannot be used to access the keyless entry and keyless start features again. When enabled, the valet dongle acts as a wireless key that provides access to the valet to the keyless entry feature of the vehicle. The valet dongle enables the keyless start feature when it is connected to the corresponding port in the vehicle. The dongle is disabled when it is connected to the corresponding port of the vehicle, the driver indicates (e.g., via the infotainment system) to disable the valet dongle, and an mobile device authorized to access the keyless entry and keyless start features is within the vicinity of the vehicle.

Figure 1B:
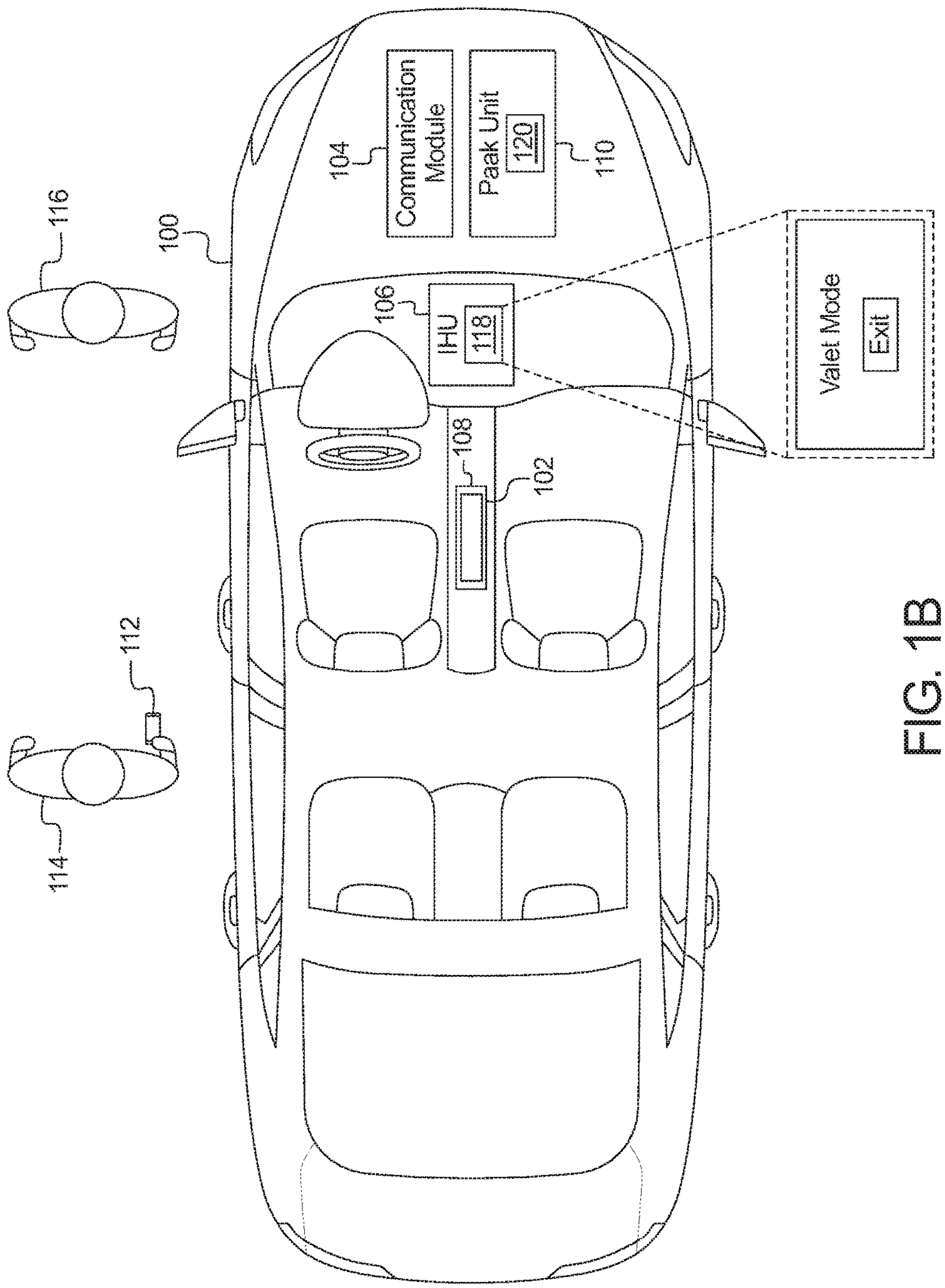
Figure 1C:
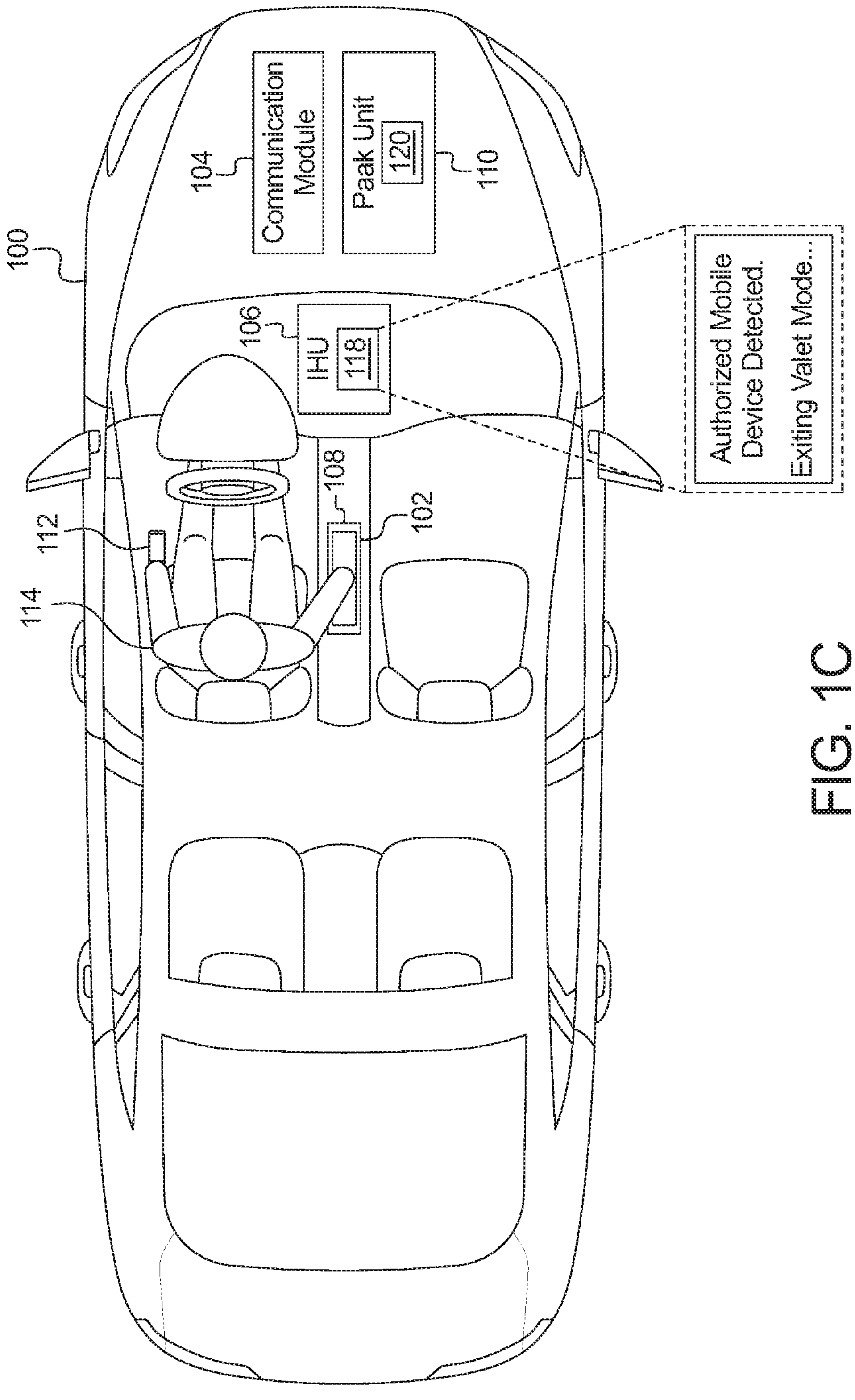

FIGS. 1A, 1B, and 1C illustrate a vehicle 100 with a valet dongle 102 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous or semi-autonomous (e.g., some routine motive functions controlled by the vehicle 100). In the illustrated example the vehicle 100 includes a communications module 104, a infotainment head unit 106, a valet dongle dock 108, and a phone-as-a-key (PaaK) unit 110.

The communications module 104 includes one or more wireless network interfaces to enable communication with a mobile device 112 (e.g., a smart phone, a smart watch, a tablet, etc.) to facilitate using the mobile device 112 for keyless entry and keyless ignition. The communications module 104 also includes hardware (e.g., processors, memory, storage, antenna, etc.) and software to control the wireless network interfaces including personal area networks (e.g., Bluetooth®, Bluetooth® Low Energy, Zigbee®, Z-Wave®, etc.) and/or wireless local area networks (including IEEE 802.11 a/b/g/n/ac or others), etc.

The infotainment head unit 106 provides an interface between the vehicle 100 and a user (e.g., an owner 114, a valet 116, etc.). The infotainment head unit 106 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, and/or speakers. As one of the input and/or output devices, the infotainment unit a center console display 118 (e.g., a liquid crystal display ("LCD"), an organic light emitting diode ("OLED") display, a flat panel display, a solid state display, etc.) to display messages to a driver and to receive input from the driver. Additionally, the infotainment head unit 106 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 106 displays the infotainment system on, for example, the center console display 118.

As disclosed below in more detail in connection with FIG. 3 below, the valet dongle dock 108 provides a space to store the valet dongle 102. In some examples, the valet dongle dock 108 recessed into a panel of the vehicle 100, such as a center console, an overhead console, a door, or a dashboard, etc. When connected to a communication port (e.g., the communication port 306 of FIG. 3 below) in the valet dongle dock 108, the valet dongle 102 is (a) communicatively coupled to the PaaK unit 110, and (b) is electrically coupled to a power bus of the vehicle 100 to charge a battery of the valet dongle 102. In some examples, the valet dongle dock 108 includes a moveable cover to conceal and/or protect the valet dongle 102 when docked.

The PaaK unit 110 (sometimes referred to herein as a "key phone unit") facilitates the PaaK application executing on the mobile device 112 to control functions of the vehicle 100 as if the mobile device were a key fob. From time to time, the PaaK unit 110, via the communications module 104, sends out a broadcast (sometimes referred to as "polling") to determine whether there are any paired mobile devices 112 in the vicinity of the vehicle 100. The PaaK unit 110 communicatively couples to the paired mobile device 112. The PaaK unit 110 and the mobile device 112 establish the connection in accordance with the particular wireless network protocol (e.g., the BLUETOOTH LOW ENERGY® protocol version 4.0 and subsequent revisions maintained by the Bluetooth Special Interest Group, etc.). The PaaK unit 110 receives commands from the PaaK app on the mobile device 112 to forward to a body control unit (e.g., for keyless entry, etc.) and/or a power train control unit (e.g., for keyless ignition, etc.).

Via the established connection, the PaaK unit 110 interrogates the mobile device 112 to determine whether the PaaK app executing on the mobile device 112 is authorized to access the keyless entry and/or keyless start functions of the vehicle 100. In some examples, the PaaK unit 110 and the PaaK app exchange one or more authorization tokens. Additionally, in some examples, the PAAK app may prompt a user for a password and/or a biometric input, such as a fingerprint, as part of generating the authorization token to send to the PaaK unit 110. For example, the authorization token generated by the PaaK app may be based on the authorization token received from the PaaK unit 110, a unique numeric value stored by the PaaK app, and a numeric value (e.g., a hash value, etc.) based on the password and/or the biometric input. Once authorized, the PAAK unit 110 accepts key fob commands (e.g., unlock the door(s), open the trunk, arm and disarm an alarm, etc.), via the connection, from the PaaK app executing on the paired mobile device 112.

The PaaK unit 110 interfaces with a passive-entry-passive-start (PEPS) system. The PEPS system (a) unlocks a door when a hand of a person is detected (e.g., via a touch sensor, via an infrared sensor, etc.) on or proximate the handle of the door, and/or (b) disengages the immobilizer and starts the engine without a key in an ignition (e.g., by pressing a ignition button, etc.) when an authorized device (e.g., the mobile device 112 executing the PaaK app) is within a zone around the vehicle 100.

In the illustrated example, the PaaK unit 110 also includes a valet manager 120. The valet manager 120 provides access to the PEPS system to the valet dongle 102 when the valet dongle 102 is enabled. When the valet dongle 102 is enabled, the PaaK unit 110 provides the functionality of the PEPS system to the valet dongle 102. In some examples, the functionality provided to the valet dongle 102 may be restricted compared to the access provided to the paired mobile device 112.

The valet manager 120 enables the valet dongle 102 when a user indicates to activate the valet system (e.g., by selecting an option on provided on the center console display 118, the valet dongle 102 is disconnected when the ignition of the vehicle is on, etc.). In some examples, the valet dongle 102 is activated by entering a passcode into the infotainment system when the valet dongle 104 is engaged with the valet dongle dock 108 and then removing the valet dongle 104 from the valet dongle dock 108. In some examples, the valet manager 120 does not enable the valet dongle 102 when the valet dongle 102 is removed from the valet dongle dock 108 when the ignition of the vehicle 100 is off. In some examples, the valet manager 120 enables the valet dongle 102 only when the authorized mobile device 112 is detected by the Paak unit 110. As illustrated in FIG. 1A, to enable the valet dongle 102, the valet manager 120 prompts, via the infotainment head unit 106, the owner to enter a passcode (e.g., a numeric or alphanumeric string of characters, etc.) to authenticate that the driver has authorization to enable the valet dongle 102. When the passcode is correct, the valet manager 120 enables the valet dongle 102. In some examples, to enable the valet dongle 102, the valet manager 120 provides a temporary authentication code to the valet dongle 102. When the PaaK unit 110 interrogates the valet dongle 102 to determine whether the valet dongle 102 is authorized to access the keyless entry and/or keyless start functions of the vehicle 100, the valet dongle 102 uses the temporary authentication code to generate the authentication tokens. The temporary authentication code is configured so that when the temporary authentication code is not longer valid, authentication tokens generated from the temporary authentication code will no longer be valid to provide access to the keyless entry and/or keyless start functions of the vehicle 100. In some examples, the valet manager 120 disables the temporary authentication code after the valet dongle 102 has been used to access the vehicle 100 a threshold number of times and/or when the valet dongle 102 is connected to the valet dongle dock 108.

When enabled, the valet dongle 102 acts as if it were keyless entry fob. For example, when the valet dongle is within a threshold distance (e.g., 5 feet, 10 feet, 20 feet, etc.) of the vehicle 100, the PaaK unit 110 may instruct the body control module to prime the door to unlock. In some examples, the valet manager 120 enables keyless ignition when the valet dongle 102 is enabled and docked in the valet dongle dock 108.

As illustrated in FIG. 1B, the valet manager 120, via the infotainment head unit 106, prompts the driver to exit valet mode when the valet dongle 102 is enabled and docked in the valet dongle dock 108. As illustrated in FIG. 1C, the valet manager 120 disables the valet dongle 102, when (a) the driver 114 indicates, via the infotainment head unit 106, to exit the valet mode, (b) the valet dongle 102 is docked into the valet dongle dock 108, and (c) the valet manager 120, via the communications module 104, detects the presence of the authorized mobile device 112 or a key fob, and/or a key is inserted into the ignition.

In some examples, when the valet dongle 102 is enabled, the valet manager 120 imposes limits on the operation of the vehicle 100. In some examples, the valet manager 120 instructs the power train control unit to limit the speed and/or acceleration of the vehicle 100 while the valet dongle 102 is enabled. Additionally or alternatively, in some examples, the valet manager 120 instructs the infotainment head unit 106 to disable the sound system while the while the valet dongle 102 is enabled. In some examples, the valet manager 120 instructs the infotainment head unit 106 to disable the infotainment system while the valet dongle 102 is enabled.

Figure 2:
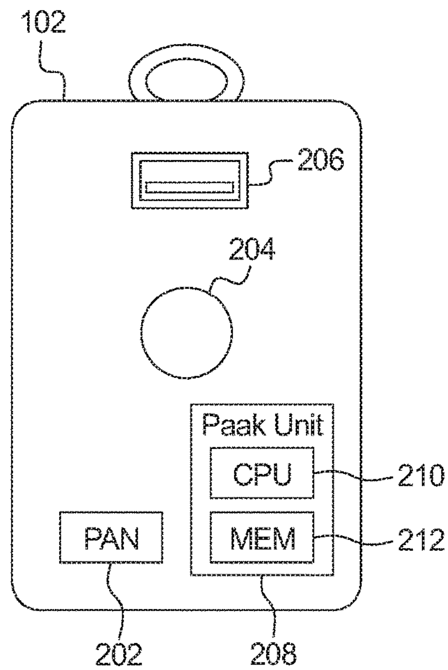
FIG. 2 illustrates the valet dongle of FIG. 1.

FIG. 2 illustrates the valet dongle 102 of FIG. 1. In the illustrated example, the valet dongle 102 includes a PAN module 202, and an input device 204, a connector 206 and a valet PaaK unit 208. The PAN module 202 includes hardware (e.g., processors, memory, storage, antenna, etc.) and software to control to interface with the personal area network (e.g., Bluetooth®, BLUETOOTH LOW ENERGY®, ZIGBEE®, Z-WAVE®, etc.) with which the communications module 104 of the vehicle 100 interfaces. The PAN module 202 wirelessly communicably couples to the communications module 104 to facilitative the valet dongle 102 interfacing with the Paak unit 110 of the vehicle 100. The input device 204 is a physical, capacitive, or virtual button, that when pressed, causes the valet dongle 102 to send a signal to the vehicle 100 to provide an indication (e.g., a horn honk, flashing headlights, etc.) used to identify the vehicle 100. The connector 206 provide an interface to electrically couple and/or communicatively couple with the vehicle 100 via the corresponding port (e.g., the communication port 306 of FIG. 3 below) of the valet dongle dock 108. In some examples, the connector 206 is a male universal serial bus (USB) connector.

The valet PaaK unit 208 interfaces, via the PAN module 202, with the PaaK unit 110 of the vehicle 100 to act as a fob to access the keyless entry and keyless ignition functions of the vehicle 100. The valet PaaK unit 208 calculates and provides the authentication token used by the PaaK unit 110 of the vehicle 100 to authorize the valet dongle 102. In the illustrated example, the valet PaaK unit 208 includes a processor or controller 210 and memory 212. The processor or controller 210 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 212 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or secure memory (sometimes referred to as "cryptomemory").

Figure 3:
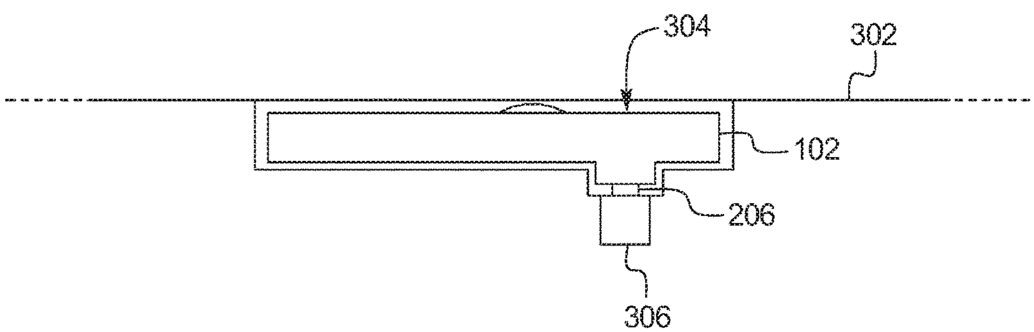
FIG. 3 illustrates the valet dongle of FIG. 1 connected to the vehicle of FIG. 1.

FIG. 3 illustrates the valet dongle 102 of FIG. 1 connected to the vehicle 100 of FIG. 1 via the valet dongle dock 108. In the illustrated example, a panel 302 of the vehicle 100 (e.g., the center console, the overhead console, the driver's side door, the dashboard, etc.) defines a cavity 304 configured to receive the valet dongle 102. In some examples, the cavity 304 is sized so that the valet dongle 102 sits within the cavity 304 so it is below a plane of the panel 302. The valet dongle dock 108 also includes a communication port 306. The communication port 306 is configured to engage with the corresponding connector 206 of the valet dongle 102. In some examples, the communication port 306 is a female USB connector. When the connector 206 of the valet dongle 102 engages with the communication port 306, the valet dongle 102 electrically couples with the power bus to the vehicle 100 to charge the battery of the valet dongle 102 and/or is communicatively coupled to the PaaK unit 110 of the vehicle 100. In some examples, the valet dongle dock 108 includes a movable cover to conceal the valet dongle 102 when the valet dongle 102 is connected to communication port 306.

Figure 4:
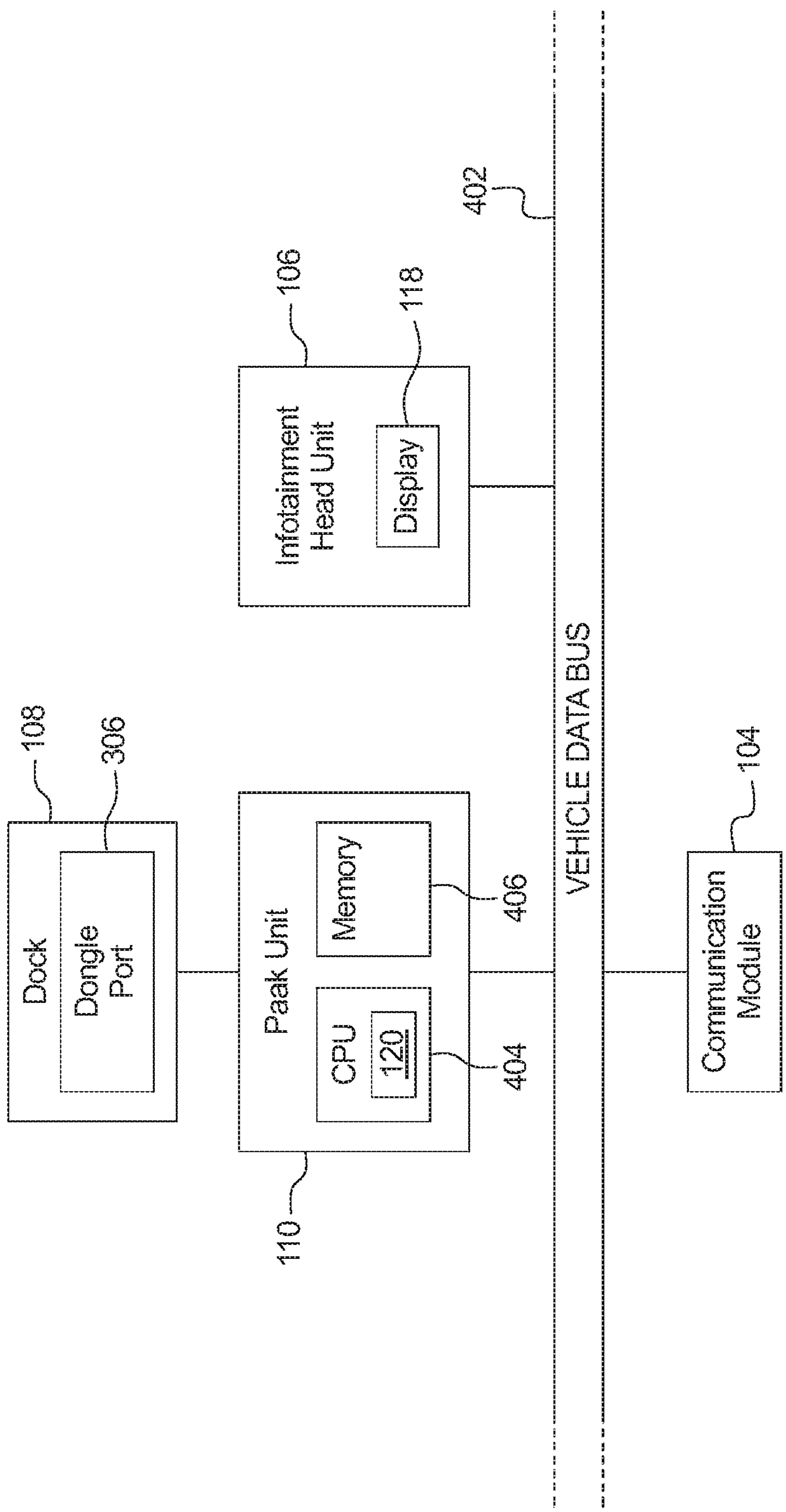
FIG. 4 is a block diagram of electronic components of the vehicle of FIG. 1.

FIG. 4 is a block diagram of electronic components 400 of the vehicle 100 of FIG. 1. In the illustrated example, the electronic components 400 include the communications module 104, the infotainment head unit 106, the PaaK unit 110, the communication port 306, and a vehicle data bus 402.

The PaaK unit 110 a processor or controller 404 and memory 406. In the illustrated example, the PaaK unit 110 is structured to include valet manager 120. The processor or controller 404 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 406 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, secure memory, and/or high-capacity storage devices (e.g., hard drives, solid state drives, etc). In some examples, the memory 406 includes multiple kinds of memory, particularly volatile memory and non-volatile memory.

The memory 406 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 406, the computer readable medium, and/or within the processor 404 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 402 communicatively couples the communications module 104, the infotainment head unit 106, and the PaaK unit 110. In some examples, the vehicle data bus 402 includes one or more data buses. The vehicle data bus 402 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
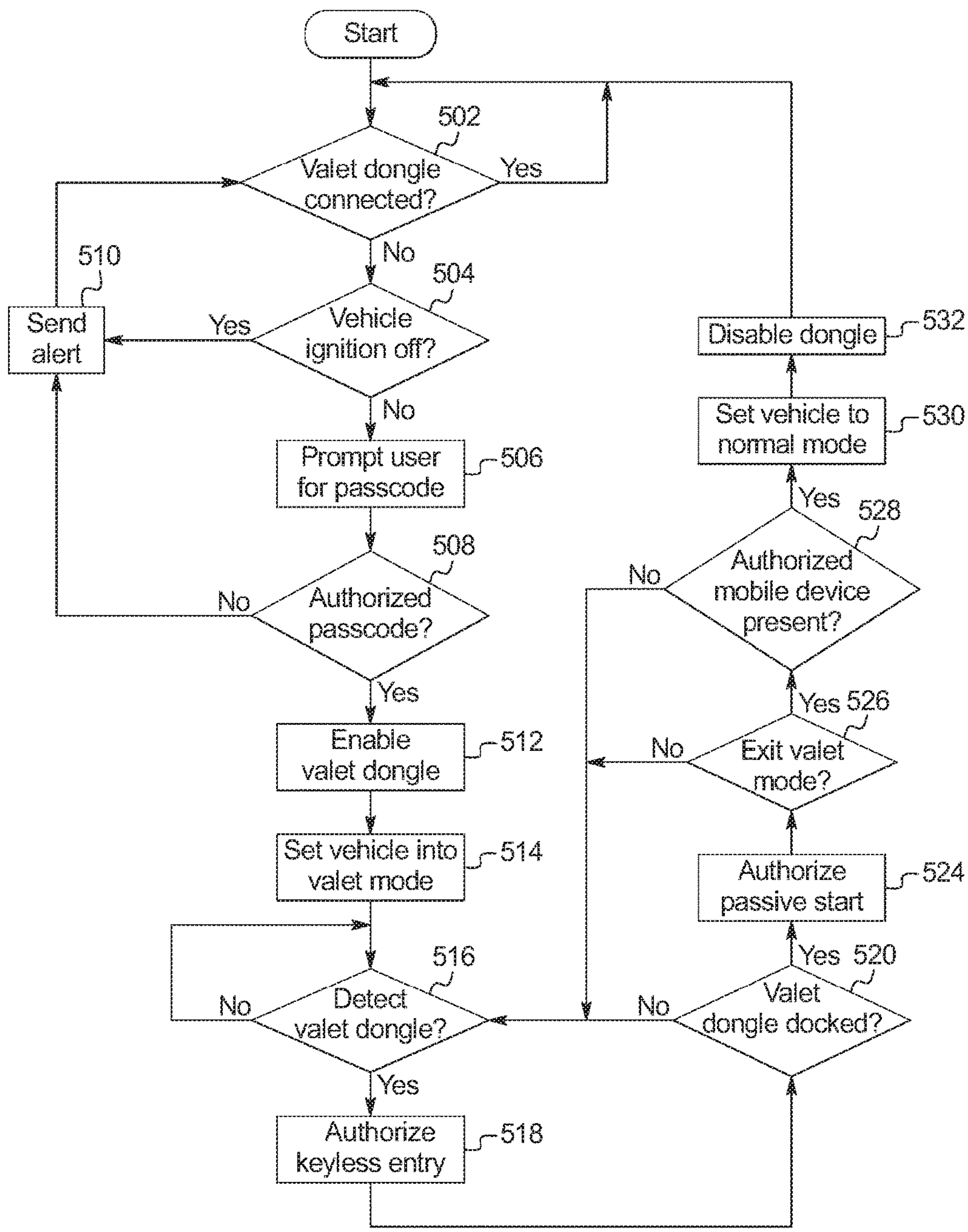
FIG. 5 is a flowchart of a method to activate and use the valet dongle of FIG. 1, which may be implemented by the electronic components of FIG. 4.

FIG. 5 is a flowchart of an example method to activate and use the valet dongle 102 of FIG. 1, which may be implemented by the electronic components 400 of FIG. 4. Initially, at block 502, the valet manager 120 waits until the valet dongle 102 is not connected to the valet dongle dock 108. At block 504, the valet manager 120 determines whether the ignition of the vehicle 100 is off. The valet manager 120 determines the state of the ignition from the power train control module. When the ignition is off, the method continues at block 510. When the ignition is on, the method continues at block 506.

At block 506, the valet manager 120 prompts the driver 114 to enter a passcode via the center console display 118 of the infotainment head unit 106. At block 508, the valet manager 120 determines whether the entered passcode matches an authorized passcode in memory (e.g., the memory 406 of FIG. 4 above). When the passcode is authorized, the method continues to block 512. Otherwise, when the entered passcode in not an authorized passcode, the method continues to block 510. Alternatively, in some examples, the valet manager 120 prompts the driver 114 to enter a passcode via the center console display 118 when the valet dongle 104 is connected to the valet dongle dock 108 and then, when the passcode is authorized, enables the valet dongle 104 before it is removed from the valet dongle dock 108. At block 510, the valet manager 120, via the communications module 104, sends an alert to the mobile device 112.

At block 512, the valet manager 120 enables the valet dongle 102. Enabling the valet dongle 102 includes instructing the PaaK unit 110 perform the keyless entry and keyless ignition functions in response to the presence of the valet dongle 102. In some examples, enabling the valet dongle 102 includes providing the valet dongle 102 with a temporary authorization code used to authenticate the valet dongle 102 with the PaaK unit 110. At block 514, the valet manager 120 sets the subsystems of the vehicle 100 (e.g., the power train module, the infotainment head unit 106, etc.) into the valet mode. In the valet mode, certain functions of the subsystems are limited and/or disabled. For example, the infotainment head unit 106 may disable the infotainment system and/or the sound system, and the power train control module may limit the speed and/or acceleration of the vehicle 100.

At block 516, in response to a trigger from the door handle, the valet manager 120 determines whether the valet dongle 102 is within range (e.g., 1 foot, 2 feet, 5 feet, etc.) of the vehicle 100 to authorize keyless entry. In some examples, the range for keyless entry for the valet dongle 102 is smaller than the range for the authorized mobile device 112. For example, the authorized mobile device 112 may preauthorize keyless entry at a range of 20 feet and the valet dongle 102 may preauthorize keyless entry at a range of 5 feet. When the valet dongle 102 is within range, at block 518, the valet manager 120 activates keyless entry. At block 520, the valet manager 120 determines whether the valet dongle 102 is connected to the valet dongle dock 108. When the valet dongle 102 is connected to the valet dongle dock 108, the method continues to block 524. Otherwise, when the valet dongle 102 is not connected to the valet dongle dock 108, the method returns to block 516.

At block 524, the valet manager 120 authorizes keyless ignition. At block 526, the valet manager 120 determines whether a user (e.g., the driver 114) has indicated to exit valet mode (e.g., by pressing a physical or virtual button on the infotainment head unit 106, etc.). When the user has indicated to exit valet mode, the method continues to block 528. When the user has not indicated to exit the valet mode, the method returns to block 516. At block 526, the valet manager 120 determines, via the communications module 104, whether the authorized mobile device 112 is in the vicinity (e.g., within 5 feet, inside, etc.) of the vehicle 100. When the authorized mobile device 112 is not in the vicinity of the vehicle 100, the method returns to block 516. Otherwise, when the authorized mobile device 112 is in the vicinity of the vehicle 100, the method continues to block 530. At block 530, the valet manager 120 instructs the subsystems of the vehicle 100 to exit the valet mode. At block 532, the valet manager 120 disabled the valet dongle 102. To disable the valet dongle 102, the valet manager 120 instructs the Paak unit 110 to not authorize the keyless entry and keyless ignition features based on the valet dongle 102. In some examples, the valet manager 120 disables the temporary authorization code stored by the valet dongle 102.

The flowchart of FIG. 5 is representative of machine readable instructions stored in memory (such as the memory 406 of FIG. 4) that comprise one or more programs that, when executed by a processor (such as the processor 404 of FIG. 4), cause the vehicle 100 to implement the example valet manager 120 of FIGS. 1 and 4. Further, although the example program(s) is/are described with reference to the flowchart illustrated in FIG. 5, many other methods of implementing the example valet manager 120 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

What is claimed is:

1. A vehicle comprising:

a valet dongle;

a dock configured to connect to the valet dongle; and a processor executing instructions to enable the valet dongle to authorize keyless entry and keyless ignition when the valet dongle is removed from the dock while an ignition of the vehicle is on and an authorized passcode is provided via an infotainment head unit.

2. The vehicle of claim 1, wherein the valet dongle includes a wireless communication module, a button, and a connector.

3. The vehicle of claim 1, wherein the dock includes a port to engage with a connector of the valet dongle when the valet dongle is docked with the dock, and wherein, when the valet dongle is docked, the valet dongle is communicatively and electrically coupled to the vehicle.

4. The vehicle of claim 1, wherein the dock is recessed into a panel of the vehicle.

5. The vehicle of claim 1, wherein to enable the valet dongle, the processor is to provide the valet dongle with a temporary authorization code that authorizes the keyless entry and the keyless ignition for a limited amount of time.

6. The vehicle of claim 1, wherein the processor is to, after enabling the valet dongle, instruct subsystems of the vehicle to enter a valet mode, the valet mode disabling or restricting features of the subsystems.

7. The vehicle of claim 1, wherein the processor is to disable the valet dongle after being enabled when the valet dongle is docked in the dock, an input to end a valet mode is received via the infotainment head unit, and an authorized mobile device is present.

8. The vehicle of claim 7, wherein after disabling the valet dongle, the processor is to instruct subsystems of the vehicle to exit the valet mode.

9. The vehicle of claim 1, wherein the processor is to enable the keyless ignition when the valet dongle is enabled and the valet dongle is docked in the dock.

10. A method comprising:

enabling, with a processor, a valet dongle associated with a vehicle to operate a keyless entry and a keyless ignition system when an authorized passcode is provided via an infotainment head unit while the valet dongle is engaged with a dock and an ignition of the vehicle is on;

after enabling the valet dongle, disabling the valet dongle when:

the valet dongle is docked in the dock, an input to end a valet mode is received via the infotainment head unit, and an authorized mobile device is present.

11. The method of claim 10, wherein the valet dongle is not a phone or a key fob.

12. The method of claim 10, wherein enabling the valet dongle includes providing the valet dongle with a temporary authorization code that authorizes the keyless entry and the keyless ignition system, the temporary authorization code being valid for a limited period of time.

13. The method of claim 10, including, after enabling the valet dongle, instructing subsystems of the vehicle to enter the valet mode, the valet mode disabling or restricting features of the subsystems.

14. The method of claim 13, including, after disabling the valet dongle, instructing the subsystems of the vehicle to exit the valet mode.

15. The method of claim 10, including enabling the keyless ignition when the valet dongle is enabled and the valet dongle is docked in the dock.

* * * * *